Figure 1:
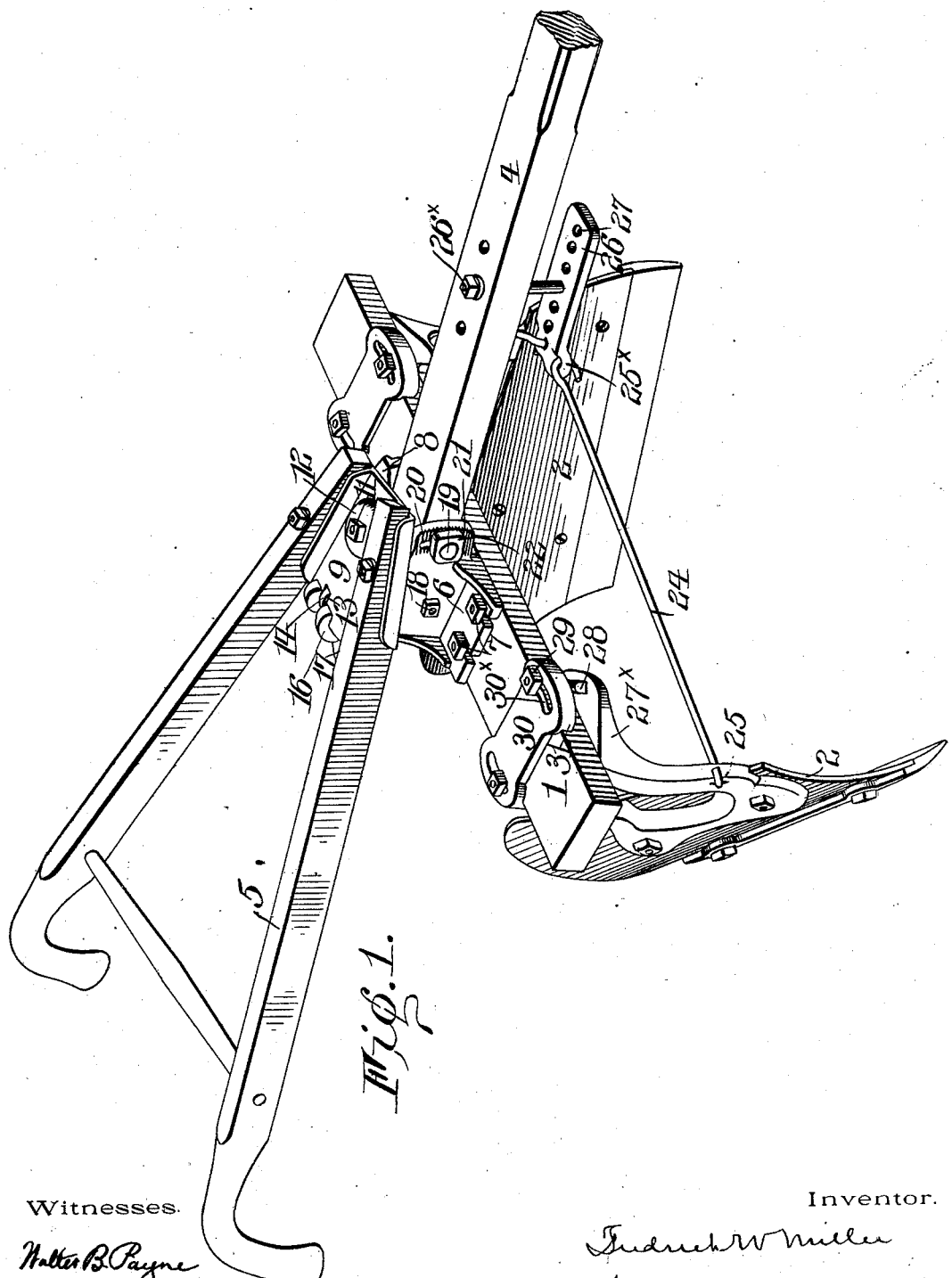

No. 746,547. PATENTED DEC. 8, 1903.
F. W. MILLER.
AGRICULTURAL IMPLEMENT.
APPLICATION FILED JULY 8, 1902.
NO MODEL. 3 SHEETS—SHEET 1.

Witnesses.
Walter B. Payne
G. Villard Rich.

Inventor.
Frederick W. Miller
Frederick S. Church
his Attorney

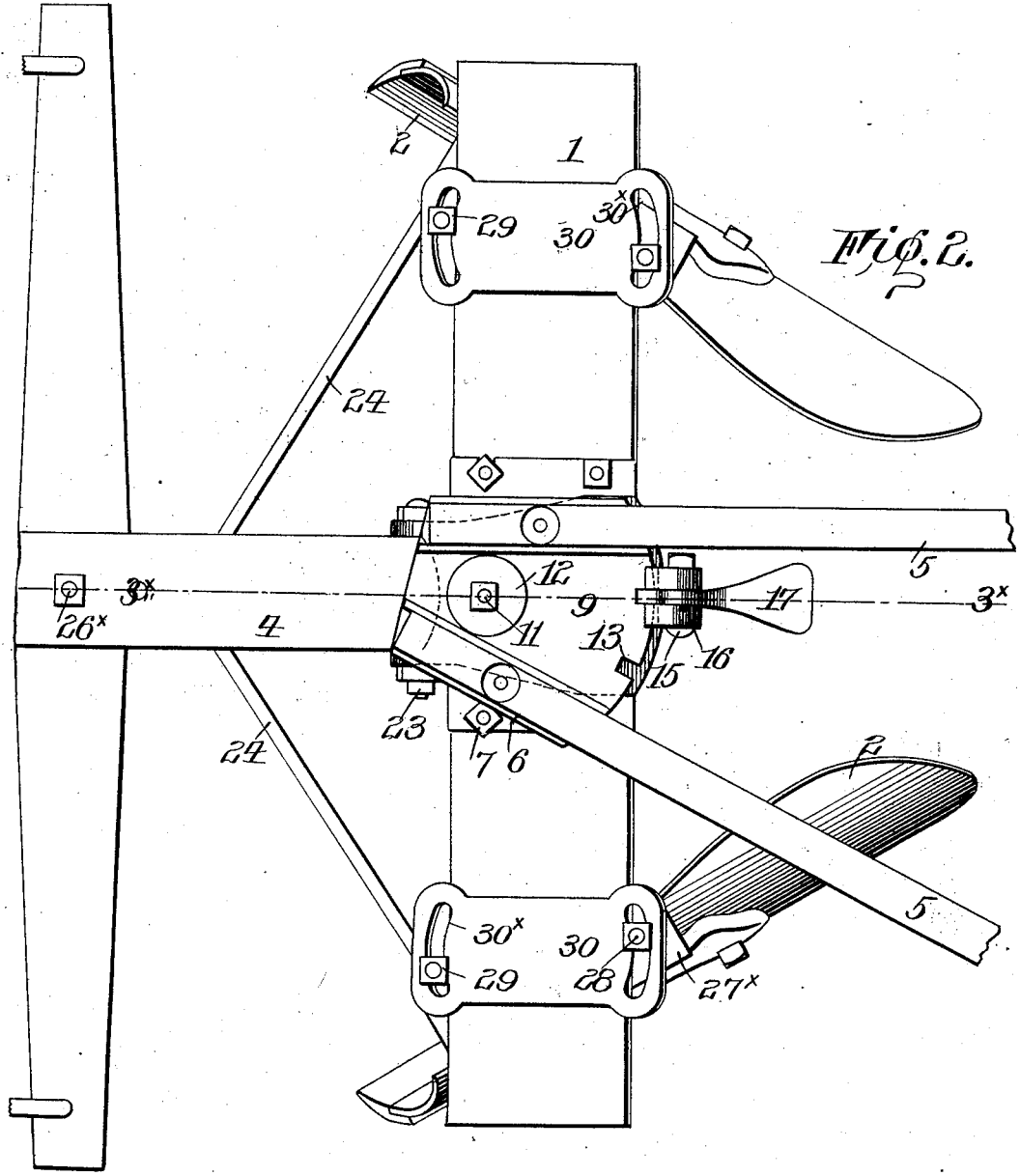

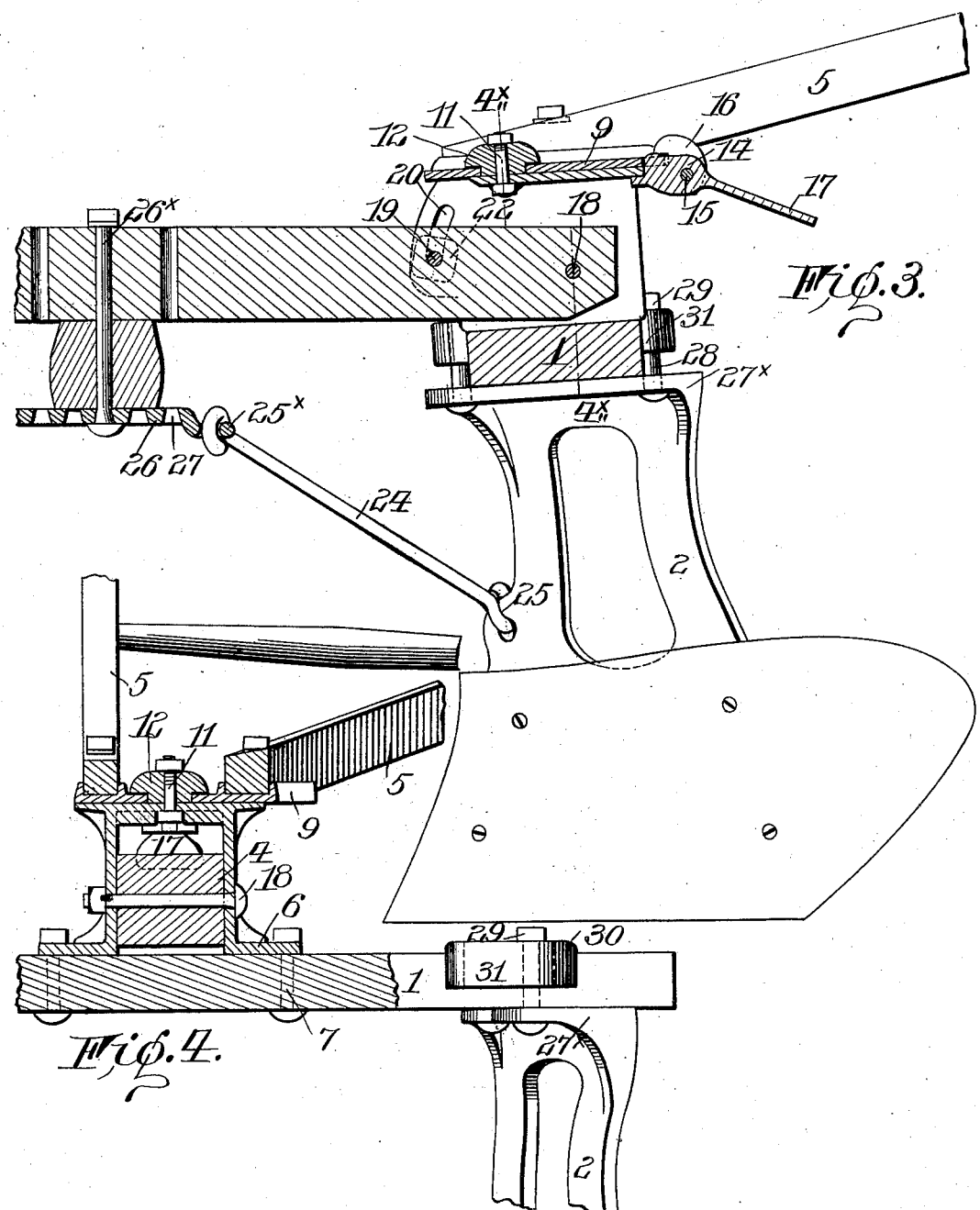

No. 746,547. Patented December 8, 1903.

UNITED STATES PATENT OFFICE.

FREDRICK W. MILLER, OF CALEDONIA, NEW YORK.

AGRICULTURAL IMPLEMENT.

SPECIFICATION forming part of Letters Patent No. 746,547, dated December 8, 1903.

Application filed July 8, 1902. Serial No. 114,778. (No model.)

*To all whom it may concern:*

Be it known that I, FREDRICK W. MILLER, of Caledonia, in the county of Livingston and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

My present invention relates to agricultural implements, and particularly to that class employed for hilling or cultivating certain vegetables; and my invention has for its object to provide a machine consisting generally of a frame having adjustable tools, such as hoes or shares, thereon disposed at opposite angles and capable of longitudinal adjustment on the frame, as well as for relative angular adjustment.

My invention has for its further object to provide suitable draft and guiding appliances and suitable means for applying them, whereby the machine may be easily manipulated by the operator.

To these and other ends the invention consists in certain improvements in construction and combinations of parts, all as will be more fully described, the novel features being pointed out in the claims at the end of this specification.

In the drawings, Figure 1 is a perspective view of a hilling-machine constructed in accordance with my invention. Fig. 2 is a top plan view of the same. Fig. 3 is a sectional view on the line $3^\times 3^\times$ of Fig. 2. Fig. 4 is a sectional view on the line $4^\times 4^\times$ of Fig. 3.

Similar reference-numerals in the several figures indicate similar parts.

A machine constructed in accordance with my invention embodies a frame or bar 1, supported at the opposite ends upon the tools or hoes 2, connected thereto by suitable supports or brackets 30, as will be further described. Located on the frame is a support to which is attached the tongue or draft appliances 4 and the guiding-handles 5. This support is for the purpose of convenience preferably constructed in two similar sections having at their lower ends outwardly-extending feet 6, through which are passed the securing-bolts 7, rigidly attaching the sections in juxtaposition on the bar, and at their upper sides the parts are provided with flanges 8, forming a broad flat surface upon which is supported a plate 9, carrying the handles 5, by means of which the device may be guided. In order that the operator when following the machine may walk in the furrow at one side of the hill, I pivot the plate 9 upon a bolt 11, the latter also extending through a washer 12, having a boss lying in the aperture in the plate and provided with an overhanging edge which engages the upper surface thereof to prevent its rocking or tilting movement, and the rear edge of the plate is curved, as shown, and provided with notches or recesses 13, in which engages a latch 14, adapted to lock the handles when they are thrown to either side of the center line, as shown in Fig. 1. The latch is journaled upon a bolt 15, which passes through lugs or ears 16 on the similar portions of the support, forming a means for securing these parts together, and the outer end 17 of the latch is weighted to normally hold it in the operative position, as shown in Fig. 2, as well as forming a handle by means of which it may be disengaged from one of the notches when the operator desires to shift the position of the handles.

The tongue 4 of the draft appliance is arranged with its rear end extending into the center casting, where it is pivotally secured by a bolt 18, its vertical adjustment relative to the frame 1 being controlled by a bolt 19, operating in segmental slots or apertures 20 at the forward edges of the supporting-sections. The latter are also provided with roughened or serrated surfaces 21, with which engage clamping-plates 22, having similar surfaces and secured by tightening the nut 23 on said bolt, as will be understood. This adjustment, it will be seen, permits the frame to be tilted, thereby regulating the position of the hoes or shares relatively to the surface of the ground, so that the operator may regulate the depth at which the hoes or shares are to be operated in the soil. To relieve the strain upon the frame as the hoes are drawn through the soil, I provide the drag-bars 24, having their outer ends loosely connected to eyes 25, arranged at the lower forward sides of the supports or brackets 30 and extending upwardly and inwardly toward their forward ends, where they are loosely attached to eyes 25× on a plate 26, provided with a series of perforations 27 and adjustably secured to the lower side of the tongue 4 by a bolt 26×.

The shares or hoes 2 are adjustably mounted on the bar or frame 1 and are capable of being moved longitudinally thereon to form a hill of any determined width, and they are also capable of a relative angular adjustment whereby they may be adjusted in a parallel position or their rear ends brought into close proximity, thus determining the width of the furrow and also the amount of soil to be scraped by each at either side of the hill. The brackets 2× are provided at their upper ends with flanges 27×, engaging the lower side of the bar or frame 1, with which they are held in engagement by means of bolts 28, provided with the nuts 29, engaging the outer surfaces of clamping-plates 30. These latter rest upon the upper surface of the bar 1 and at each end have downwardly-extending projections 31, which engage the forward and rear edges of the bar, preventing any lateral or twisting motion of the clamping-plate thereon, but allowing it to be moved longitudinally on the bar. At each end of the plate are segmental slots 30×, curved upon a common center and adapted to receive the bolts 28. By this construction it will be seen that to change the angle of a share or hoe it is simply necessary to loosen the nuts 29, the segmental slots 30× permitting the bolts 28, carried by the brackets, to move inwardly or outwardly until the desired position is attained, and this is also permitted without changing the relative positions of the centers of the respective brackets and clamping-plates. By providing the slots at opposite ends of the plates a greater adjustment is permitted the tool than it is possible to attain if but one slot is employed unless the length of the latter is increased, thus necessitating the use of a wider clamping-plate. While I have described the segmental slots as being arranged in the clamping-plates, it will be understood that they might be arranged in the supports or brackets 2 and the fastening devices or bolts 28, carried by the clamping-plates. The longitudinal adjustment of the plate 26 on the tongue 4 permits the share or hoes when said plate is removed to be moved closer together or separated a greater distance, as desired, and the refastening of the plate is accomplished by inserting the bolt 26× in the proper aperture and securing it as before.

An agricultural implement constructed in accordance with my invention is simple and consists of few parts, which are easily constructed and assembled. By arranging the clamping-plates and brackets as previously described the shares or hoes are permitted a lateral movement and also a relative angular adjustment to each other, and the drag-bars extending from the tongue to the brackets near the shares greatly strengthens the parts.

I claim as my invention—

1. In an agricultural implement, the combination with a frame having operating-tools thereon, a support on the frame composed of separate sections, of a plate journaled on the support having guiding-handles thereon and provided with notches, a bolt securing said sections together and a latch pivoted on the bolt and adapted to engage the notches to lock the handles in adjusted position.

2. In an agricultural implement, the combination with a frame having operating-tools thereon, a hollow support on the frame, a tongue having the end journaled in the support and clamping devices engaging the tongue and support, of a plate pivoted on the support having notches therein, guiding-handles attached to the plate, and a latch pivoted to the support and engaging said notches to secure the handles in adjusted position.

3. In an agricultural implement, the combination with a frame having operating-tools thereon, a support on the frame composed of separate sections provided with vertically-extending elongated apertures and having flanges at their upper edges, a tongue extending between the sections, and a bolt extending through the latter and forming a pivot for the tongue, a bolt carried in the tongue and projecting through the elongated apertures and clamping-plates on the bolt engaging the sides of the support, of a plate pivoted on the latter provided with recesses and having guiding-handles, a securing member extending through the supporting-sections and a lock journaled on said member and adapted to engage the recesses in the plate to secure the handles in adjusted position.

4. In an agricultural implement, the combination with the frame, of a tool carrying a supporting member movably engaging one side of the frame, and a clamping member engaging the opposite side thereof having overhanging portions formed thereon provided with abutments adapted to embrace the lateral edges of the frame to prevent lateral or twisting motion of said clamping member thereon, and clamping-bolts attached to said supporting member and resting in elongated apertures in the clamping member for securing said members upon said frame in relative adjusted position.

5. In an agricultural implement, the combination with a frame comprising a bar and tools carried thereby and engaging one side of the bar, of clamping-plates engaging the other side of the bar having the ends extending beyond the edges of the bar, adjustable fastening devices, between said ends of the plate and the tools, whereby their relative distance and their relative angular adjustment may be varied, and drag-bars attached to the tools to relieve the strain of the latter on the frame.

6. In an agricultural implement, the combination with the cross bar or support, and shares connected thereto and a draft bar or member, of guiding-handles rigidly secured together and extending at an angle to each other and pivotal connections between said handles and support whereby they may be freely adjusted together relatively to the plane of the draft-bar and a locking device for securing them in adjusted position.

FREDRICK W. MILLER.

Witnesses:
CHARLES MENZIE,
D. WALTER.